United States Patent [19]

Kiczek et al.

[11] Patent Number: 5,168,723
[45] Date of Patent: Dec. 8, 1992

[54] METHOD AND APPARATUS FOR INDIVIDUALLY QUICK FREEZING SMALL SURFACE MOIST ARTICLES

[75] Inventors: Edward F. Kiczek, Long Valley, N.J.; Earl W. Moore, Macungie, Pa.; David L. Mitchell, Jr., Coopersburg, Pa.; Kevin S. McAfee, Reading, Pa.

[73] Assignee: Air Products and Chemicals, Inc., Allentown, Pa.

[21] Appl. No.: 788,904

[22] Filed: Nov. 7, 1991

[51] Int. Cl.[5] .............................................. F25D 25/02
[52] U.S. Cl. ........................................ 62/381; 62/374
[58] Field of Search ................... 62/63, 374, 380, 381

[56] References Cited

U.S. PATENT DOCUMENTS

| | | | |
|---|---|---|---|
| 3,485,055 | 12/1969 | Webster et al. | 62/63 |
| 3,992,899 | 11/1976 | Spahn | 62/381 |
| 4,033,142 | 7/1977 | Schorsch et al. | 62/381 |
| 4,062,202 | 12/1977 | Cloudy | 62/380 |
| 4,403,479 | 9/1983 | Rasovich | 62/374 |
| 4,528,819 | 7/1985 | Klee | 62/266 |
| 4,813,245 | 3/1989 | Hubert et al. | 62/266 |
| 4,852,358 | 8/1989 | Acharya et al. | 62/63 |
| 4,989,416 | 2/1991 | Miller et al. | 62/381 |

Primary Examiner—Ronald C. Capossela
Attorney, Agent, or Firm—James C. Simmons; William F. Marsh

[57] ABSTRACT

Method and apparatus for quick freezing particles with surface moisture by immersion in liquid cryogen to produce a frozen crust or layer on the particles followed by agitation in content with the vaporized cryogen to complete freezing and prevent clumping of the particles.

5 Claims, 1 Drawing Sheet

METHOD AND APPARATUS FOR INDIVIDUALLY QUICK FREEZING SMALL SURFACE MOIST ARTICLES

FIELD OF THE INVENTION

The present invention pertain to freezing individual particles of surface moist products such as diced vegetables or non-food materials such as ground rubber, plastics and the like which may have been subject grinding in the presence of a cooling medium such as water.

BACKGROUND OF THE INVENTION

In the preparation of diced foodstuffs and particles of non-food stuffs, there is desire to have the particles frozen into individual moieties or particles in order to have a frozen free-flowing product. Devices such as shown in U.S. Pat. No. 4,989,416 have been found to be satisfactory when freezing small individual particles that are essentially dry or in other words devoid of surface moisture.

The problem with trying to freeze individual particles that contain moisture on the surface is that when the particles are exposed to conventional freezing techniques such as shown in U.S. Pat. No. 4,989,416 the frozen particles tend to clump or stick together. This is true for a host of food products from vegetables such as carrots and celery to seafood products such as clams and scallops, to grain products such as rice and noodles.

In prior art devices after the freezing was accomplished, the particles would be subjected to a cluster buster in the form of a centrifugal wheel which is used break apart the clusters. Unfortunately, at the same time the clusters were destroyed, the product itself was subject to breakage and therefore the overall product was damaged and not attractive for the consumer.

SUMMARY OF THE INVENTION

The present invention overcomes the problems with prior art devices by utilizing a method and apparatus to first expose the particles to be frozen to a liquid cryogen to effect a light precise crust freeze to set the surface moisture prior to contact with anything other than a liquid cryogen. After the crust freeze takes place, the product then is in a form which is exposed to vaporized cryogen to complete the freezing. Should any clumping occur during the second phase of the process, light agitation will break up the clumps without destroying or damaging the product. Controlled agitation during the second stage prevents product from adhering to any surface in the freezer and achieves the final frozen particle.

Processes according to the present invention are ideally suited to preparation of meals on an automatic processing line where dispensing of an exact amount of the frozen product is required. Furthermore, the process and apparatus of the present invention provide improved product quality through lower dehydration losses, representing a savings in product weight which ultimately lowers production cost.

DETAILED DESCRIPTION OF THE PRESENT INVENTION

Figure 1:
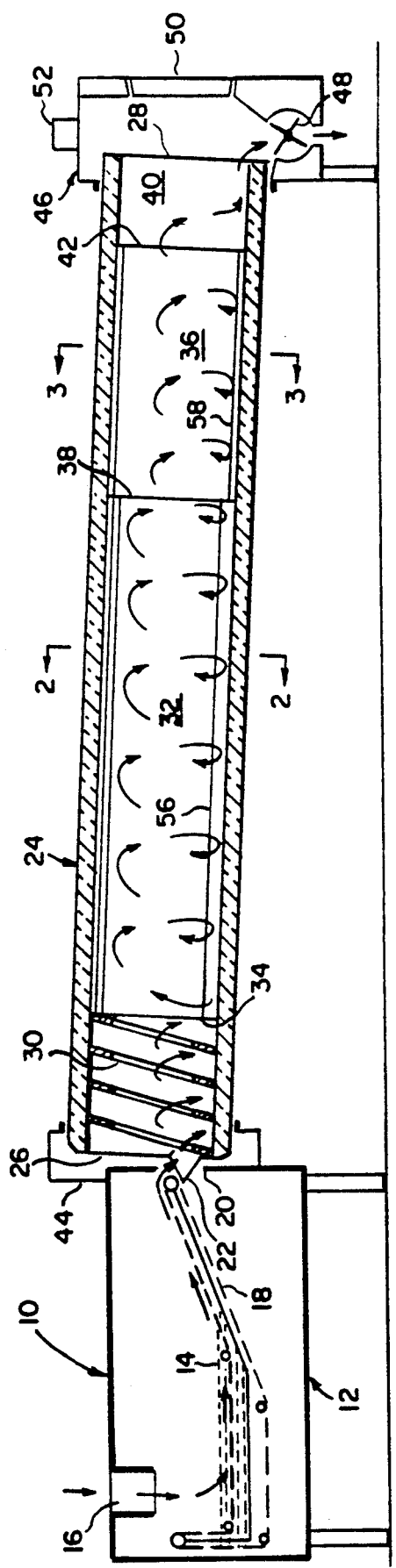
FIG. 1 is a longitudinal section through an elevational view, highly schematic of the apparatus according to the present invention.
Figure 3:
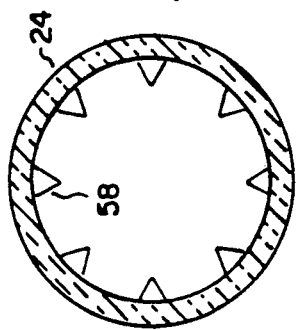
FIG. 3 is a section taken along line 3—3 of FIG. 1.
Figure 2:
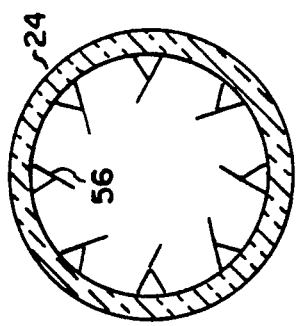
FIG. 2 is the section taken along line 2—2 of FIG. 1.

The apparatus of the present invention as shown in FIG. 1 includes a first section 10 which includes a vessel shown generally as 12 adapted to maintain a bath of liquid cryogen 14. Vessel 12 includes a product entrance 16, whereby product maybe introduced into the liquid cryogen 14. A continuous conveyor belt 18 is disposed inside of the housing 12 to move the product from the bath toward a discharge end 20 of vessel 12. Discharge end 20 has a discharge chute 22, so that the product can be introduced into a second section 24, which is in the form of an elongated cylinder or kiln, having a generally circular cross section. Second section or kiln section 24 includes a first or entry end 26 for the product and a second or discharge end 28 for the product. The kiln is divided into four sections, the first of which 30 is a transfer section which has on the internal surface a screw flight, so that the product entering the tunnel 24 is moved progressively from the entry end 26 toward the discharge end 28 of the tunnel as the kiln section 24 is rotated about its longitudinal axis. Next to the first or transfer section is a second or lifting section 32, which extends from the end 34 of the transfer section 30, to the beginning of a third or tumbling section 36, the beginning of tumbling section 36 being shown as 38. Tumbling section 36 extends from location 38 to the beginning of a kilning section 40 which is represented by the numeral 42. The kilning section 40 terminates in a discharge end 28 of kiln section 24. Kiln section 24 can be fabricated from materials such as stainless steel that are used in handling food. Furthermore, kiln section 24 can be insulated. Disposed between first section 10 and section 24 is a mating or sealing section 44, which prevents cryogen vaporizing in the first section 10 from escaping into the atmosphere. More importantly mating section 44 causes the cryogen vaporizing in section 10 to be directed into the kiln section 24. Disposed on the exit end 28 of kiln section 24 is an airlock device 46 which includes a product discharge damper 48 and access doors 50. Airlock 46 is in fluid tight relation to the kiln section 24 and includes means such as an exhaust fan (not show) mounted to exhaust conduit 52 to move vaporized cryogen from section 10 through kiln section 24 and outwardly through the airlock 46. As shown in FIGS. 2 and 3 lifting section 32 and tumbling section 36 have disposed on the interior surface of the kiln section a series of flights 56, 58 to move the product through the kiln in a direction from the entry end 25 to the discharge end 28. The lift flights 56 are generally higher than the tumble flights 58 as shown schematically in the drawing. However, the particular shape or length of flights will vary with the dimensions of the tunnel section 24. Kilning section 40 is a generally smooth wall portion without flights.

In operation a product to be frozen e.g. diced celery is introduced into the first section 10 through the product entrance 16. The celery falls into the liquid cryogenic bath, where after a predetermined time it is moved via the conveyor 18 into the kiln section 24. The product is allowed to remain in the cryogenic liquid for a period of time sufficient to provide a light uniform frozen crust on the individual particles and the retention time in the liquid cryogen does not necessarily have to, and generally does not permit through freezing of the product. As the particle is moved through the kiln section 24, as shown by the arrows in FIG. 1, vaporized cryogen is pulled into the kiln 24 by the exhaust fan mounted onto conduit 52. As the product moves through the various sections of the kiln, final freezing is effected and clumping is avoided by the light agitation of the product. The reason for the differing stages of agitation in the tunnel is to prevent excessive agitation as the fragility of the product increases with colder product temperatures. The process and apparatus of the present invention are distinguished from the prior art by the combination of freezing and agitation to prevent destruction of the product while providing individual quick frozen product without clumping or agglomeration.

A device according to the present invention was tested on various food stuffs with the results set forth in Table 1.

TABLE 1

| Product | Dip Time (sec.) | Kiln Time (min.) |
|---|---|---|
| Cauliflower spears | 14 | 6 |
| Diced vegetables (carrots, celery) | 7.5 | 5 |
| Peas/Cut beans | 8.5 | 5 |
| Rice | 6 | 5 |
| Clam Strips and Scallops | 5.5 | 7 |
| | 7 | 5 |
| Mushroom slices | 7 | 5 |
| Corn and Peas | 9 | 7 |
| Broccoli spears | 10 | 6 |

During the foregoing tests it was observed that when the cut product was dropped into the immersion unit, the product would be lightly crust frozen when removed at the specified interval. The product having been introduced into liquid nitrogen which was the cryogen used and the nitrogen off-gas are then transferred to the kiln section 24, where the product is moved through the kiln section with agitation. At the times set forth above with agitation, freezing is completed in the kiln section. Average kiln section temperatures range from between $-100°$ to $-50°$. As a result the product being discharged from the apparatus through discharge 48 is individually quick frozen items of even the most difficult products such as glutinous rice. The individual food stuffs are then used to provide a free flowing individually quick frozen product to be used in making prepared meals on an automated line or dispensing of an exact amount of frozen product is required. Thus the method and apparatus of the present invention can be applied to any freezing where portion control is required.

More importantly, the frozen product quality is improved through lower dehydration losses which represents a saving in product weight, which ultimately lowers product costs. With a process according to the present invention, dehydration losses were reduced by 35% without serious product clumping.

The method and apparatus of the present invention are ideally suited to providing individually quick frozen food stuffs. However, any particle than can be frozen using cryogenic techniques where surface moisture is the problem can be frozen using the method and apparatus of the present invention.

Having thus described our invention, what is desired to be secured by letters patent of the United States is set forth in the appended claims.

We claim:

1. An apparatus for quick freezing individual particles having surface moisture comprising in combination;
    a first section having a vessel adapted to contain a bath of liquid cryogen, said first section having means to admit particles to and remove particles from said bath;
    a second section being in the shape of a kiln or tunnel having a generally circular cross-section said second section adapted to receive particles removed from the bath in said first section and direct them from a first or entry end to a second or discharge end, said second section containing internal sub-sections to cause said particles to move from said entry end to said discharge end in a period extending from five to fifteen seconds;
    a mating or sealing section between said first and second sections said mating section adapted to confine cryogen vaporized in said first section and direct said vaporized cryogen into said second section; and
    an airlock device disposed in fluid tight relation around the discharge end of said second section, said airlock device adapted to direct particles and vaporized cryogen exiting through the discharge end of said second section.

2. An apparatus according to claim 1 wherein said first section includes a conveyor extending from below the surface of the bath of liquid cryogen to the first end of said tunnel to move particles from said bath of liquid cryogen to said tunnel.

3. An apparatus according to claim 1 wherein said tunnel includes as sub-sections extending serially from said first end toward said second end a first or transfer section, a second or lifting section, a third or tumbling section and a fourth or smooth wall section without flights.

4. An apparatus according to claim 3 wherein said second and third sections include lifting flights on the interior of said tunnel section.

5. An apparatus according to claim 3 wherein said first section includes a screw flight on the interior of said tunnel.

* * * * *